(12) United States Patent
Kimura

(10) Patent No.: US 10,030,998 B2
(45) Date of Patent: Jul. 24, 2018

(54) DISPLACEMENT DETECTING DEVICE BY LIGHT RETROREFLECTANCE HAVING FIRST AND SECOND RETROREFLECTING UNITS WITH A COMMON LIGHT RECEIVING UNIT

(71) Applicant: MITUTOYO CORPORATION, Kawasaki-shi, Kanagawa (JP)

(72) Inventor: Akihide Kimura, Tokorozawa (JP)

(73) Assignee: MITUTOYO CORPORATION, Kawaski-Shi (JP)

( * ) Notice: Subject to any disclaimer, the term of this patent is extended or adjusted under 35 U.S.C. 154(b) by 54 days.

(21) Appl. No.: 15/220,483

(22) Filed: Jul. 27, 2016

(65) Prior Publication Data
US 2017/0030744 A1 Feb. 2, 2017

(30) Foreign Application Priority Data
Jul. 28, 2015 (JP) .................................. 2015-148381

(51) Int. Cl.
*G01D 5/26* (2006.01)
*G01D 5/38* (2006.01)

(52) U.S. Cl.
CPC .............. *G01D 5/266* (2013.01); *G01D 5/38* (2013.01)

(58) Field of Classification Search
CPC .................................. G01D 5/266; G01D 5/38
USPC .................................. 250/225, 216, 231.13
See application file for complete search history.

(56) References Cited

U.S. PATENT DOCUMENTS

| 5,066,130 A * | 11/1991 | Tsukiji ..................... G01D 5/38 250/237 G |
| 5,104,225 A | 4/1992 | Masreliez |
| 2006/0139654 A1 | 6/2006 | Takahashi et al. |
| 2011/0286004 A1 | 11/2011 | Holzapfel et al. |
| 2012/0194824 A1 | 8/2012 | de Groot et al. |
| 2013/0128255 A1* | 5/2013 | Liu .......................... G01D 5/34 355/72 |

FOREIGN PATENT DOCUMENTS

| JP | 4-270920 | 9/1992 |
| JP | 6-23662 | 3/1994 |
| JP | 4722474 | 4/2011 |

OTHER PUBLICATIONS

European Search Report dated Dec. 23, 2016, 8 pages.

* cited by examiner

*Primary Examiner* — Que T Le
(74) *Attorney, Agent, or Firm* — Rankin, Hill & Clark LLP

(57) ABSTRACT

A displacement detecting device includes a scale diffraction grating and a detecting head unit. The detecting head unit includes a light source, a first retroreflecting unit that retroreflectes positive first-order diffracted light of light diffracted by the scale diffraction grating, such that the retroreflected light enters the scale diffraction grating again, a second retroreflecting unit that retroreflectes negative first-order diffracted light of the light diffracted by the scale diffraction grating, such that the retroreflected light enters the scale diffraction grating again, and a light receiving unit that receives an interference signal. Each of the first retroreflecting unit and the second retroreflecting unit has a deflecting function of deflecting light incident on the corresponding retroreflecting unit by a predetermined angle and then emitting the light.

4 Claims, 10 Drawing Sheets

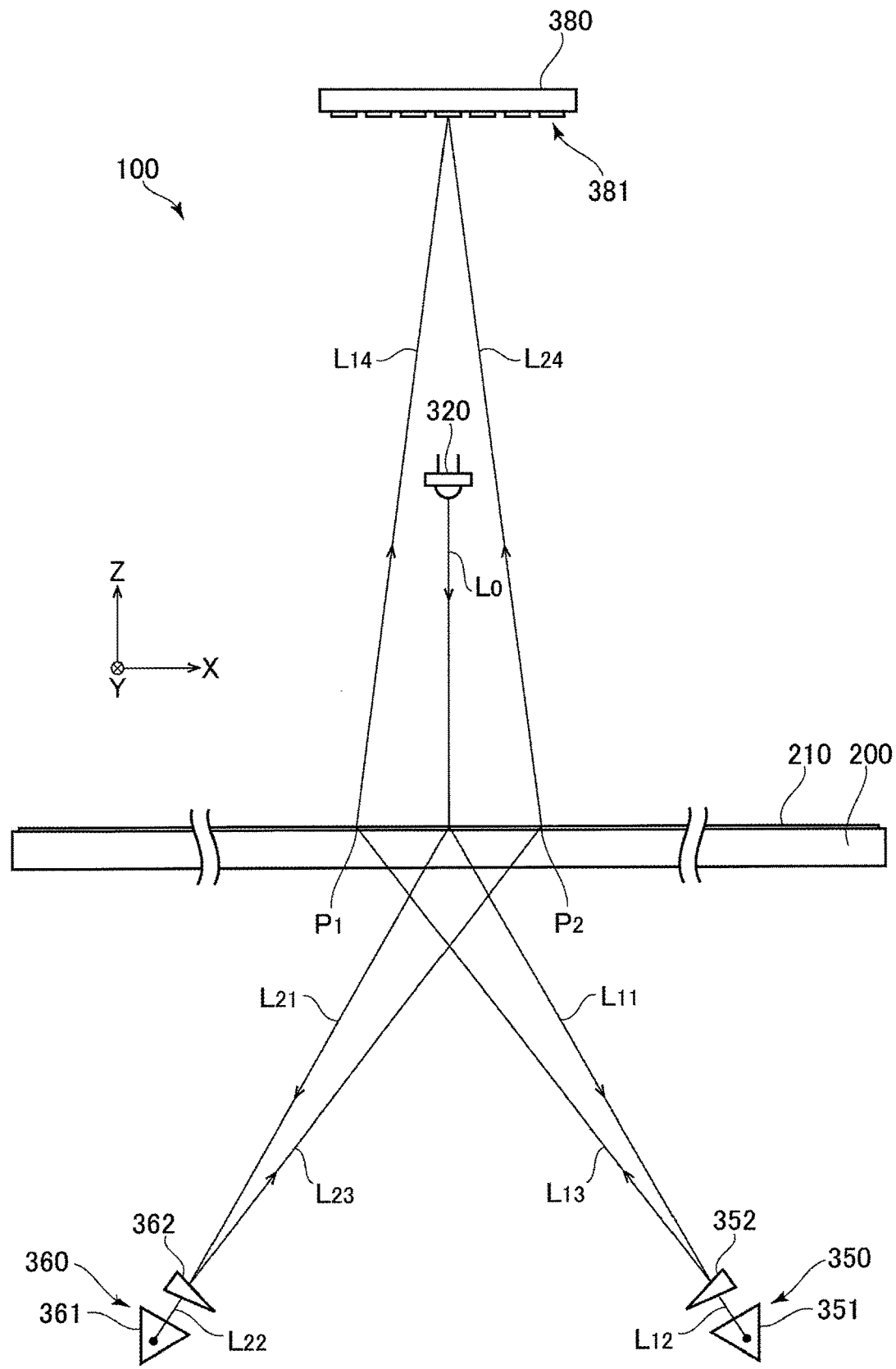

DISPLACEMENT DETECTING DEVICE BY LIGHT RETROREFLECTANCE HAVING FIRST AND SECOND RETROREFLECTING UNITS WITH A COMMON LIGHT RECEIVING UNIT

CROSS-REFERENCE TO RELATED APPLICATION

The present application claims priority from Japanese Patent Application No. 2015-148381 filed on Jul. 28, 2015, the entire content of which is incorporated herein by reference.

BACKGROUND

Technical Field

The present invention relates to a displacement detecting device, and more specifically, to a photoelectric encoder.

Related Art

As displacement detecting devices, photoelectric encoders are being widely used.

There are proposed retroreflection type photoelectric encoders which are aimed at an improvement in resolution of encoders and an improvement in robustness to misalignment and are configured by combining scale diffraction gratings and retroreflective devices (for example, Japanese Patent Application Laid-Open No. 4-270920, Japanese Patent No. 4722474, and Japanese Patent Application Publication No. 6-23662)

One of typical examples of retroreflection type photoelectric encoders is disclosed in Japanese Patent Application Laid-Open No. 4-270920.

Light is divided into two beams due to first diffraction by a scale diffraction grating. These individual beams are retroreflected by retroreflective devices, and are diffracted again by the scale diffraction grating, and then enter a light receiving device.

However, if the two beams are mixed (interfere) with each other before entering the light receiving device, the characteristics of the retroreflection type are lost (especially, phase difference information for discriminating their movement directions is lost).

Therefore, in order to prevent the two beams from being mixed (interfering) with each other, their polarizing axes are set so as to be perpendicular to each other.

In Japanese Patent Application Laid-Open No. 4-270920, polarizers having polarizing axes perpendicular to each other are installed in the light paths of the individual beams, so as to polarize the beams, such that the polarized beams form a right angle.

Moreover, a plurality of beam splitters, a plurality of phase plates (wave plates), and a plurality of polarizers are used to extract two phase signals having a phase difference of 90 degrees from each other.

According to this configuration, optical resolution which is four times that of a configuration in which light is diffracted only once is achieved.

Also, since light is retroreflected to the scale diffraction grating, it is possible to compensate for tilting and rotating of the scale diffraction grating. Therefore, robustness to misalignment is improved.

Patent Document 1: Japanese Patent Application Laid-Open No. 4-270920

Patent Document 2: Japanese Patent No. 4722474

Patent Document 3: Japanese Patent Application Publication No. 6-23662

As a general problem of retroreflection type photoelectric encoders, there is a problem that the number of components increases.

Even in Japanese Patent Application Laid-Open No. 4-270920, a very complicated configuration is necessary to extract a phase difference signal (even in Japanese Patent No. 4722474, there is the same problem).

As another configuration example, there is Japanese Patent Application Publication No. 6-23662.

In Japanese Patent Application Publication No. 6-23662, although the configuration is made without using any phase plate (wave plate) and any polarizer, instead, two or four auxiliary diffraction gratings are necessary in addition to a scale diffraction grating which is a main scale.

For this reason, there is a problem that a reduction in the size (an increase in the degree of integration) of a retroreflection type photoelectric encoder is difficult.

SUMMARY

Exemplary embodiments of the invention provide a retroreflection type photoelectric encoder capable of reducing the number of components and suitable for downsizing.

A displacement detecting device according to an exemplary embodiment of the invention, comprises:

a scale diffraction grating; and a detecting head unit that is disposed so as to be relatively movable with respect to the scale diffraction grating, and detects the amount of relative displacement to the scale diffraction grating, wherein the detecting head unit includes a light source that emits light toward the scale diffraction grating, a first retroreflecting unit that retroreflectes positive s-order diffracted light of light diffracted by the scale diffraction grating, such that the retroreflected light enters the scale diffraction grating again, a second retroreflecting unit that retroreflectes negative s-order diffracted light of the light diffracted by the scale diffraction grating, such that the retroreflected light enters the scale diffraction grating again, and a light receiving unit that receives an interference fringe formed by the light retroreflected by the first retroreflecting unit and diffracted by the scale diffraction grating and the light retroreflected by the second retroreflecting unit and diffracted by the scale diffraction grating, and each of the first retroreflecting unit and the second retroreflecting unit has a deflecting function of deflecting light incident on the corresponding retroreflecting unit by a predetermined angle and then emitting the light (wherein "s" is an integer of 1 or greater).

A position of a point on the scale diffraction grating where the light retroreflected from the first retroreflecting unit enters may be different from a position of a point on the scale diffraction grating where the light retroreflected from the second retroreflecting unit enters.

Each of the first retroreflecting unit and the second retroreflecting unit may include a corner cube and a wedge prism.

The corner cube and the wedge prism may be integrated.

Each of the first retroreflecting unit and the second retroreflecting unit may include a reflective mirror and two lenses having different focal lengths.

BRIEF DESCRIPTION OF THE DRAWINGS

FIG. 10 illustrates a case of using a transmission type main scale.

DETAILED DESCRIPTION

Embodiments of the present invention will be described with reference to the drawings which illustrate the embodiments and in which individual components are denoted by reference symbols.

First Embodiment

Figure 1:
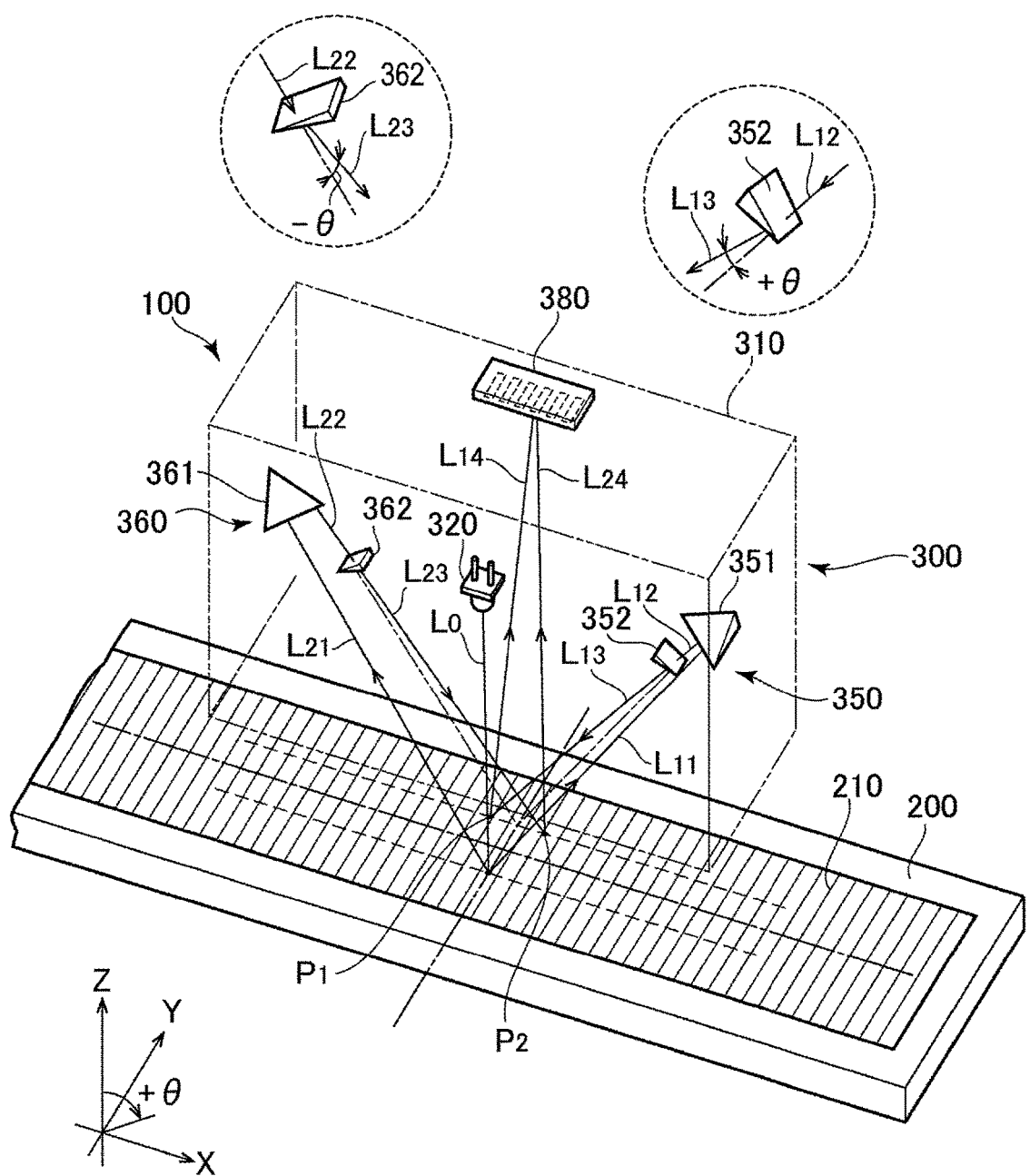
FIG. 1 is a view illustrating a first embodiment according to a displacement detecting device.

FIG. 1 is a view illustrating a first embodiment according to a displacement detecting device 100 of the present invention.

Figure 2:
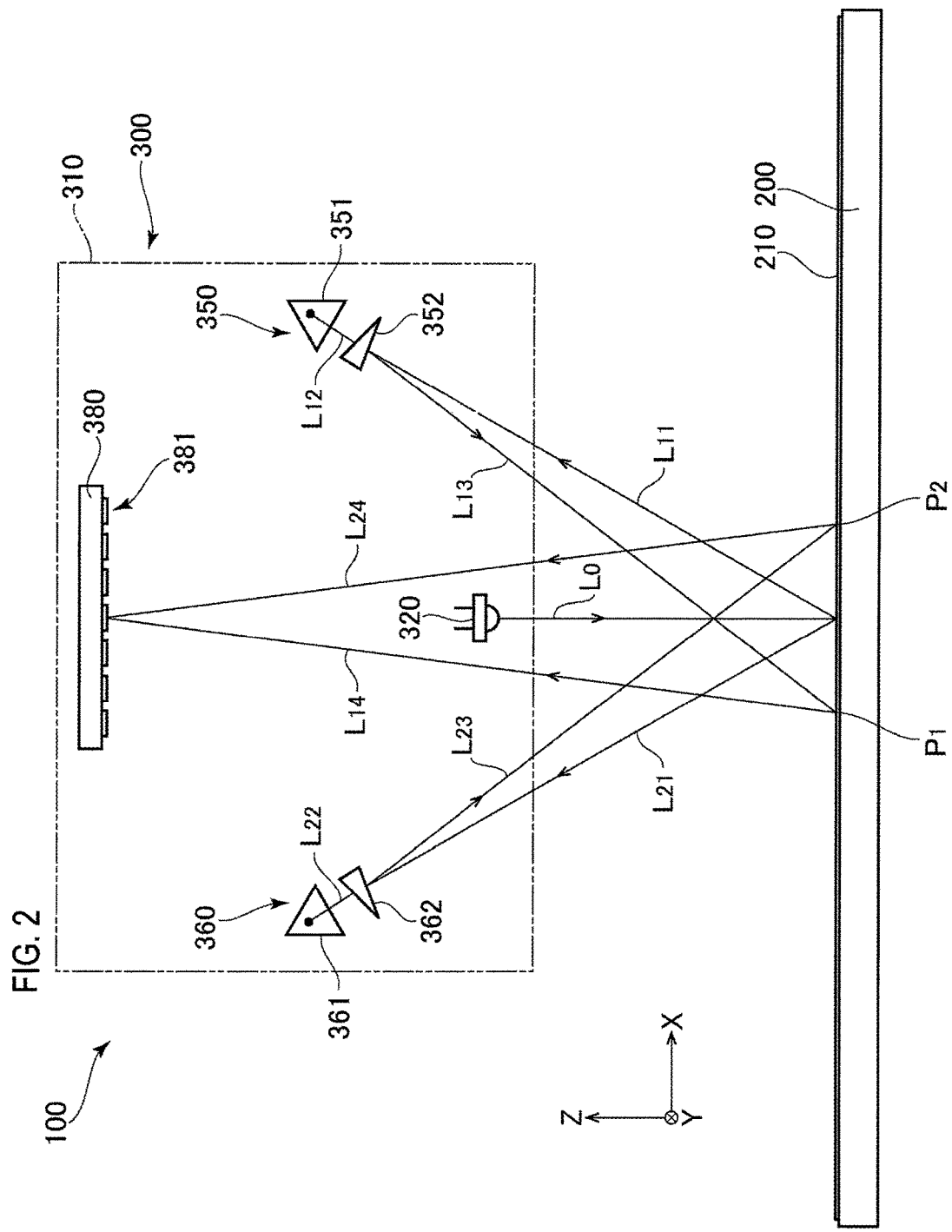
FIG. 2 is a front view of the first embodiment.

Also, FIG. 2 is a front view of the first embodiment.

In FIGS. 1 and 2, in order to make the configuration conspicuous, a housing 310 of a detecting head unit 300 is shown by a broken line, and the inside of the housing 310 is shown as seen through the housing.

The displacement detecting device 100 includes a main scale 200 and the detecting head unit 300.

The main scale 200 and the detecting head unit 300 are installed so as to be relatively movable with respect to each other, and the detecting head unit 300 detects the amount of relative displacement of the detecting head unit 300 to the main scale 200. The main scale 200 includes a reflection type diffraction grating 210 along the longitudinal direction of the main scale which is the length measurement axis direction.

In order for explanation, the longitudinal direction (length measurement axis direction) of the main scale 200 is taken as an X axis, and the transverse direction of the main scale 200 is taken as a Y axis, and the direction of the normal to the main scale 200 is taken as a Z axis.

A typical example of the main scale 200 is obtained by depositing a thin metal film on a glass substrate.

After a metal such as aluminum, chrome, or gold is deposited on the glass substrate, etching is performed, whereby reflective sections are patterned in the diffraction grating 210 having a grating pitch P.

(Moreover, it is more preferable to compensate for zero-order light or make only positive and negative first-order diffracted light strongly diffract by adjusting not only the pitch P but also the height "h" of the grating.)

The detecting head unit 300 includes a light source 320, two retroreflecting units 350 and 360, and a light receiving unit 380, inside the housing 310 shown by the broken line.

These components will be sequentially described along light paths.

The light source 320 is a light source for emitting laser light, and may be, for example, a laser diode (LD). However, since the light source needs only to be able to emit coherent light, the type of the light source is not limited. The light source 320 emits light L0 along the Z axis, and the light L0 enters the main scale 200 at a right angle. After entering the main scale 200 the light L0 is reflected and diffracted by the diffraction grating of the main scale 200.

In the reflected and diffracted light, the positive first-order diffracted light L11 and the negative first-order diffracted light L21 are used in displacement detection. In the present embodiment, the positive first-order diffracted light L11 propagates in the positive direction of the X axis, and the negative first-order diffracted light L21 propagates in the negative direction of the X axis.

The retroreflecting units include the first retroreflecting unit 350 which reflects the positive first-order diffracted light L11 toward the main scale 200, and the second retroreflecting unit 360 which reflects the negative first-order diffracted light L21 toward the main scale 200.

The first retroreflecting unit 350 includes a first corner cube 351 and a first wedge prism 352. Similarly, the second retroreflecting unit 360 includes a second corner cube 361 and a second wedge prism 362.

The positive first-order diffracted light L11 enters the first corner cube 351, and is retroreflected by the first corner cube 351.

In this first embodiment, it is assumed that the incident light (L11) on the first corner cube 351 shifts in the positive direction of the Y axis (that is, the transverse direction of the main scale 200), and then is emitted in parallel with the incident light (L11), as shown in FIG. 1.

The light (L12) emitted from the first corner cube 351 subsequently passes through the first wedge prism 352.

The light (L13) having passed through the first wedge prism 352 is emitted from the first wedge prism 352 at a predetermined deflection angle.

Here, a rotation direction of the Z axis toward the X axis in the X-Z plane is referred to as a positive rotation direction (+θ).

In this case, the first wedge prism 352 deflects the incident light (L12) in the X-Z plane by a predetermined very small angle (+θ) in the positive rotation direction, and then emits the light.

The light (L13) emitted from the first wedge prism 352 enters the main scale 200. A point on the main scale 200 where the light (L13) emitted from the first wedge prism 352 enters is referred to as a retroreflection incidence point P1.

The light (L13) is reflected and diffracted at the retroreflection incidence point P1 by the main scale 200.

In the reflected and diffracted light, the positive first-order diffracted light L14 is used in displacement detection.

The positive first-order diffracted light L14 enters the light receiving unit 380.

The negative first-order diffracted light L21 enters the second corner cube 361, and is retroreflected by the second corner cube 361.

As shown in FIG. 1, the incident light (L21) on the second corner cube 361 shifts in the positive direction of the Y axis (that is, the transverse direction of the main scale 200), and then is emitted in parallel with the incident light (L21).

The light (L22) emitted from the second corner cube 361 subsequently passes through the second wedge prism 362.

The light (L23) having passed through the second wedge prism 362 is emitted from the second wedge prism 362 at a predetermined deflection angle.

The second wedge prism 362 deflects the incident light (L22) in the X-Z plane by a predetermined very small angle (−θ) in the negative rotation direction, and emits the deflected light.

The light (L23) emitted from the second wedge prism 362 enters the main scale 200.

A point on the main scale 200 where the light (L23) emitted from the second wedge prism 362 enters is referred to as a retroreflection incidence point P2.

The light (L23) is reflected and diffracted at the retroreflection incidence point P2 by the main scale 200.

In the reflected and diffracted light, the negative first-order diffracted light L24 is used in displacement detection.

The negative first-order diffracted light L24 enters the light receiving unit 380.

The positive first-order diffracted light L14 and the negative first-order diffracted light L24 enter the light receiving unit 380, and form an interference fringe on the light receiving unit 380.

The light receiving unit 380 has a light receiving device array 381 on its light receiving surface.

Figure 3:
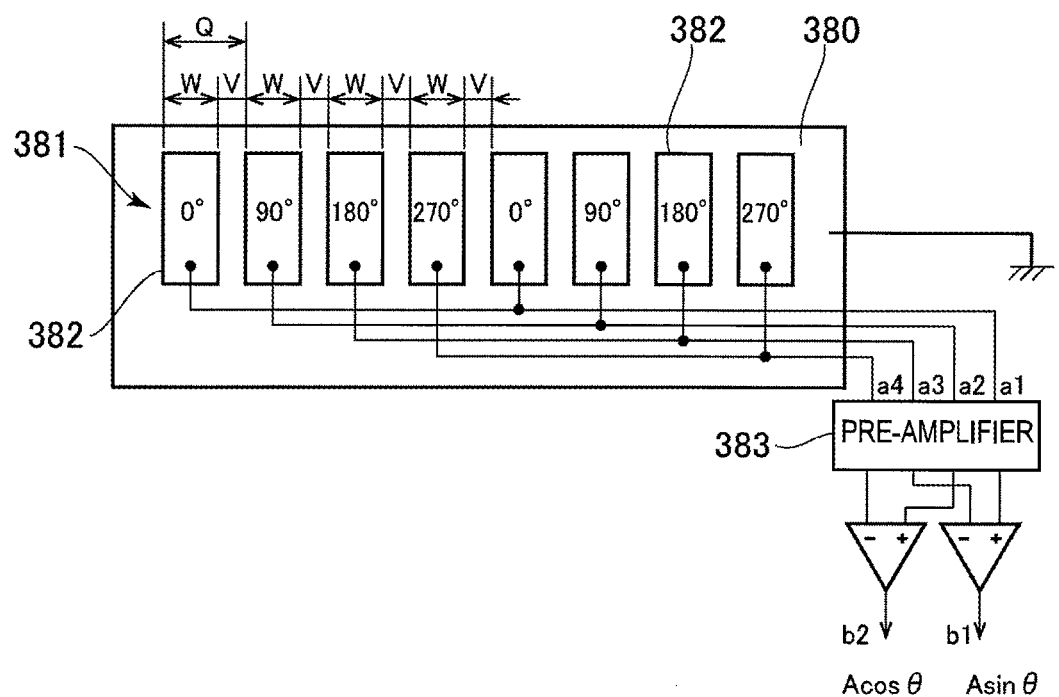
FIG. 3 is a view illustrating arrangement of a light receiving device array formed on a light receiving unit.

FIG. 3 is a view illustrating arrangement of the light receiving device array 381 formed on the light receiving unit 380.

The light receiving device array 381 is configured by disposing light receiving devices 382 having a width W (=λ/2) at intervals V (=λ/4) with respect to the wavelength λ of the interference fringe (that is, the pitch Q of the light receiving devices 382 is 3λ/4). The phase difference between detection signals which are obtained by adjacent light receiving devices 382 is 90°. If light receiving devices 382 having the same phase are connected, it is possible to obtain detection signals a1, a2, a3, and a4 having phases 0°, 90°, 180°, and 270°, respectively.

The detection signals a1 to a4 are amplified by a pre-amplifier 383, and then every two signals having a phase difference of 180° (the signal a1 and the signal a3, and the signal a2 and the signal a4) are differentially amplified.

As a result, a signal b1 (A sin θ) and a signal b2 (A cos θ) are obtained. On the basis of these signals, it is possible to obtain the movement amount and movement direction of the interference fringe.

However, arrangement of the light receiving devices 382 is not limited to the above described example, and any other arrangement may be used as long as it is possible to extract detection signals of two or more phases in response to displacement of the interference fringe. For example, in order to obtain signals of three phases, various arrangements such as arrangement in which the intervals V' between the light receiving devices 382 is λ/3 (=120°) can be used.

In this configuration, if the main scale 200 and the detecting head unit 300 relatively move in the length measurement axis direction (the X axis direction), an interference fringe is displaced according to the relative movement amount and the relative movement direction. The displacement amount and displacement direction of the interference fringe are detected by the light receiving unit 380.

According to this first embodiment, it is possible to achieve the following effects.

(1) The first and second wedge prisms 352 and 362 deflect the light L13 and L23. Therefore, the retroreflection incidence points P1 and P2 of the light L13 and L23 are different from each other. Since the retroreflection incidence points P1 and P2 of the light L13 and L23 are different from each other, the reflected and diffracted light (L14 and L24) from the individual retroreflection incidence points P1 and P2 are not multiplexed (do not interfere with each other) before the light receiving unit 380. Therefore, it is possible to detect the phase signal of the interference fringe in the light receiving unit 380.

(2) By the simple configuration in which the wedge prisms 352 and 362 are put in the individual light paths, it becomes possible to take advantage of the retroreflection type photoelectric encoder to detect displacement with optical resolution which is four times that of a configuration in which light is diffracted only once. Needless to say, it is also possible to discriminate displacement directions.

In the related art, in order to prevent two beams from being multiplexed (interfering with each other) before the light receiving unit 380 or to make two beams not interfere with each other before light receiving unit and then make the beams interfere with each other in the light receiving unit 380, a plurality of polarizers, a plurality of phase plates (wave plates), or a plurality of diffraction gratings should be used.

In this respect, according to the present embodiment, the number of components dramatically decreases. Therefore, it is apparent that the present embodiment has remarkable superiority in reducing the size and the cost. Since the number of components is less, it becomes easier to make the detecting head unit 300 compact with a high degree of integration. Therefore, it is possible to expect effects not only in downsizing but also in reducing the assembling cost.

First Modification

In the first embodiment described above, the corner cubes and the wedge prisms are separate components.

Figure 4:
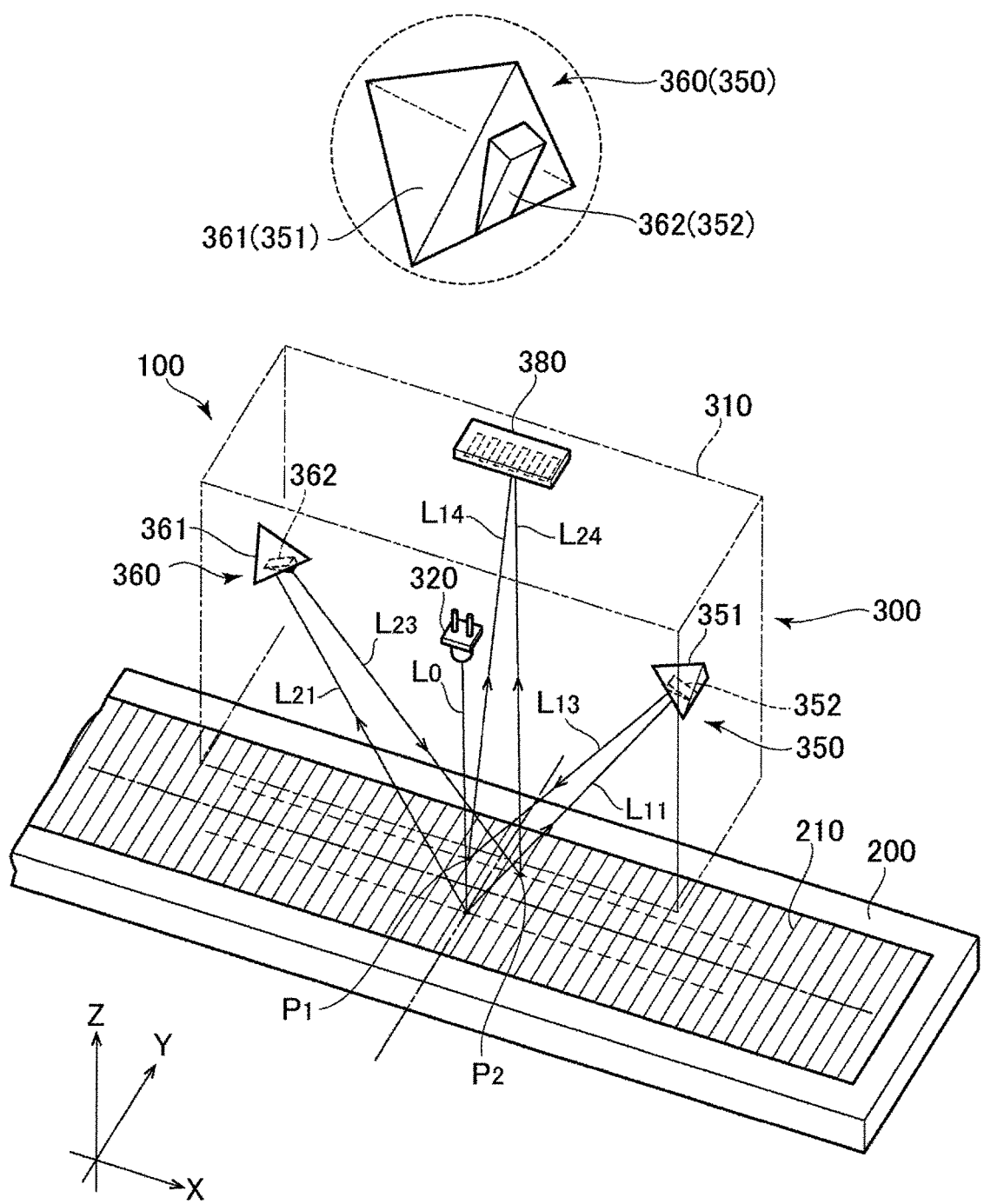
FIG. 4 is a view illustrating a corner cube and a wedge prism integrated with each other.

However, as shown in FIG. 4, each corner cube and a corresponding wedge prism may be integrated.

If each corner cube and a corresponding wedge prism are integrated as described above, a photoelectric encoder more suitable for downsizing and increasing the degree of integration is obtained.

Second Modification

The configuration of each retroreflecting unit is not limited to the combination of a corner cube and a wedge prism.

For example, each retroreflecting unit having a deflecting function may be configured by combining a mirror 373 and lenses 371 and 372.

Figure 5:
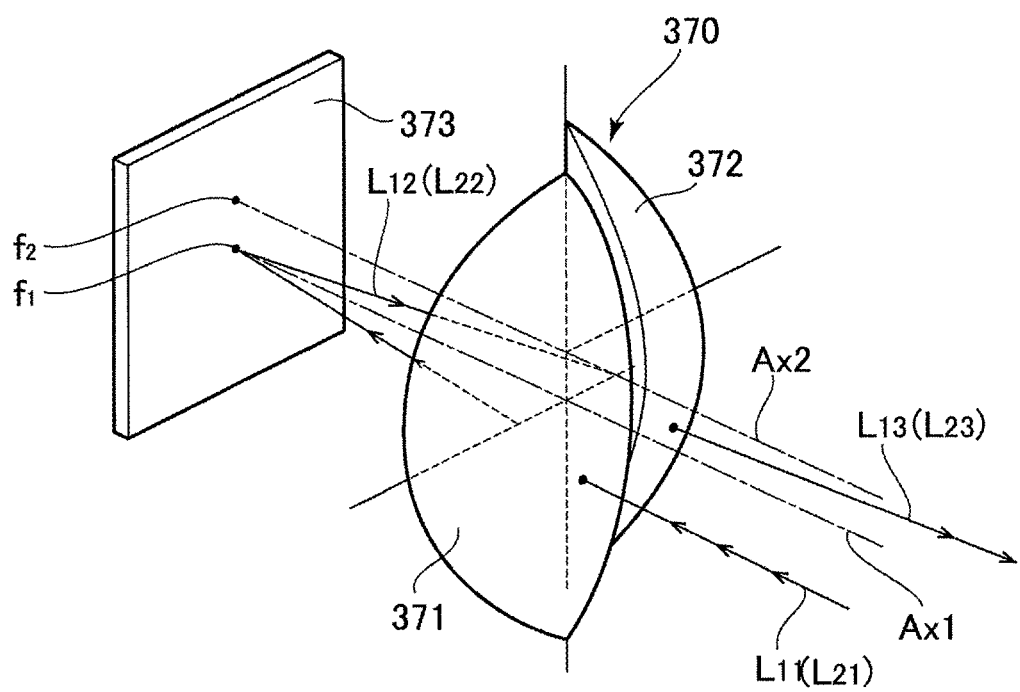
FIG. 5 is a view illustrating an example of a retroreflecting unit which is configured by combining a mirror and lenses.

FIG. 5 shows an example of a retroreflecting unit which is configured by combining a mirror 373 and lenses 371 and 372. The lenses 371 and 372 include the first lens 371 which the reflected and diffracted light (L11 or L21) from the main scale 200 enters, and the second lens 372 from which the light (L13 or L23) is emitted toward the main scale 200. Here, each of the first lens 371 and the second lens 372 is configured by cutting a lens in half.

Also, in FIG. 5, each of the first lens 371 and the second lens 372 is configured by cutting a lens at a plane including its optical axis AX1 or AX2. However, since their shapes do not matter, the cutting plane may not include the optical axis AX1 or AX2.

(For example, each lens may be cut at a plane parallel with the optical axis.)

The first lens 371 and the second lens 372 are disposed such that the optical axis AX1 of the first lens 371 and the optical axis AX2 of the second lens 372 are parallel with each other but are deviated from each other.

In FIG. 5, the first lens 371 and the second lens 372 are bonded in the state where their optical axes AX1 and AX2 are deviated from each other.

As a result, this lens array has two focuses of a focus f1 based on the first lens 371 and a focus f2 based on the second lens 372. Therefore, this lens array will be referred to as a bifocal lens array 370.

The mirror 373 is disposed at the focal position f1 of the first lens 371 so as to be perpendicular to the optical axis AX1 of the first lens 371.

The reflected and diffracted light (L11 or L21) from the main scale 200 first enters the first lens 371.

In order to facilitate imagining of the light paths, it is assumed that the reflected and diffracted light (L11 or L21) from the main scale 200 enters the first lens 371 in parallel with the optical axis AX1 of the first lens 371. (However, the light (L11 or L21) does not propagate on the optical axis AX1 of the first lens 371, and enters the first lens 371 at a position deviated from the optical axis AX1 of the first lens 371.)

The light (L11 or L21) propagates toward the mirror 373 while being refracted by the first lens 371, and then is reflected by the mirror 373. The reflected light (L11 or L21) from the mirror 373 passes through the second lens 372. Then, the light (L13 or L23) is emitted from the second lens 372, with a predetermined angular offset relative to the incident light (L11 or L21).

The mirror 373 is disposed at the focus f1 of the first lens 371 so as to be perpendicular to the optical axis AX1. If the reflected light from the mirror 373 passes through the first lens 371 again, the light (L13 or L23) is emitted only in parallel with the incident light (L11 or L21), so there is no deflection (angular offset) between the incident light (L11 or L21) and the emitted light (L13 or L23).

Here, the cut first lens 371 and the cut second lens 372 are bonded such that the optical axes AX1 and AX2 are deviated from each other, whereby the bifocal lens array 370 is configured. Therefore, the reflected light (L12 or L22) from the mirror 373 passes through the second lens 372, and the light (L13 or L23) is emitted from the second lens 372, with the predetermined angular offset relative to the incident light (L11 or L21).

As described above, it is possible to configure a retroreflecting unit having a deflecting function, even by combining the mirror 373 and the bifocal lens array 370.

In order to facilitate understating of the drawings and the description, the case where the mirror 373 is disposed at the focus of the lens 371 has been exemplified. However, as long as the mirror 373 can reflect light having passed through the first lens 371 such that the light enters the second lens 372, the installation position and installation angle of the mirror 373 are not limited.

Second Embodiment

Figure 6:
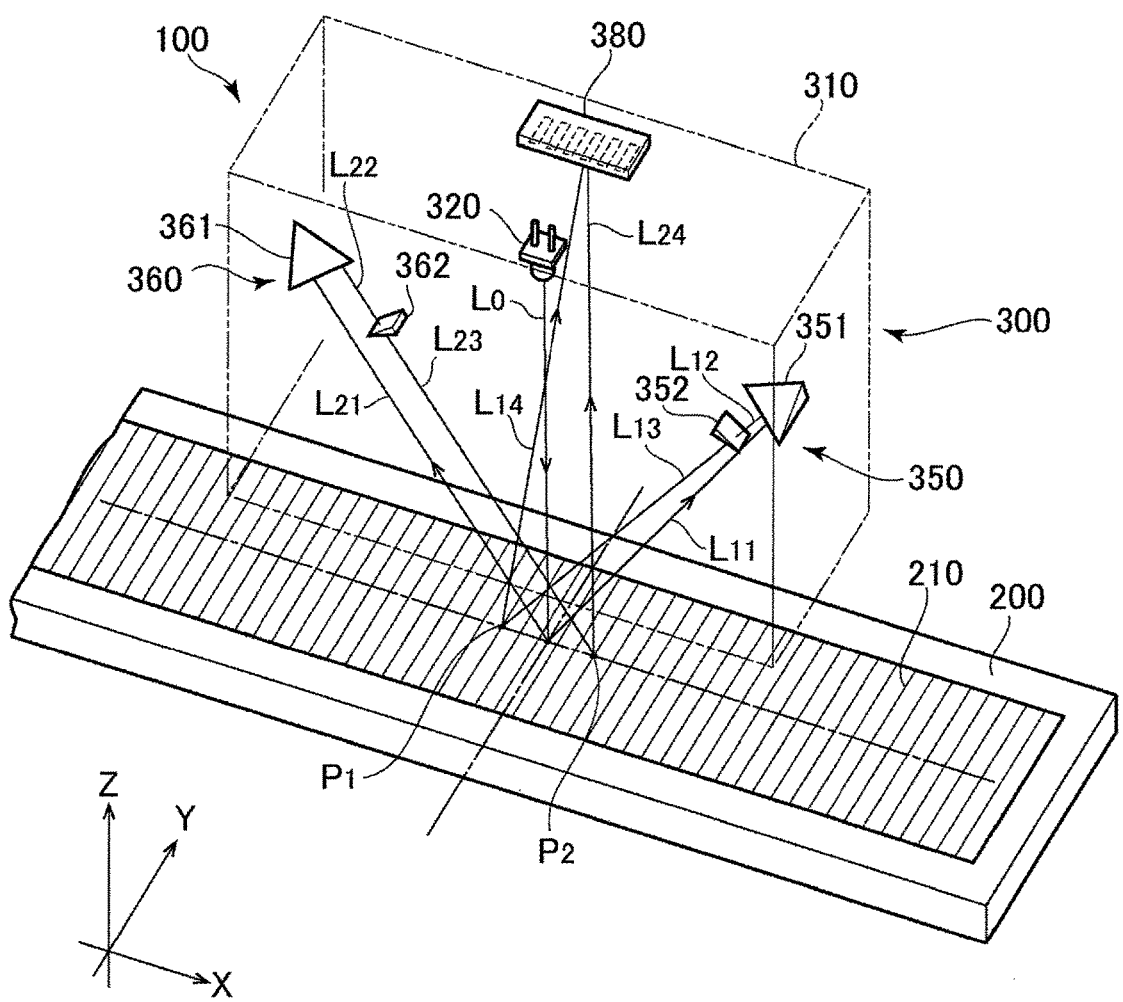
FIG. 6 is a view illustrating a second embodiment.
Figure 7:
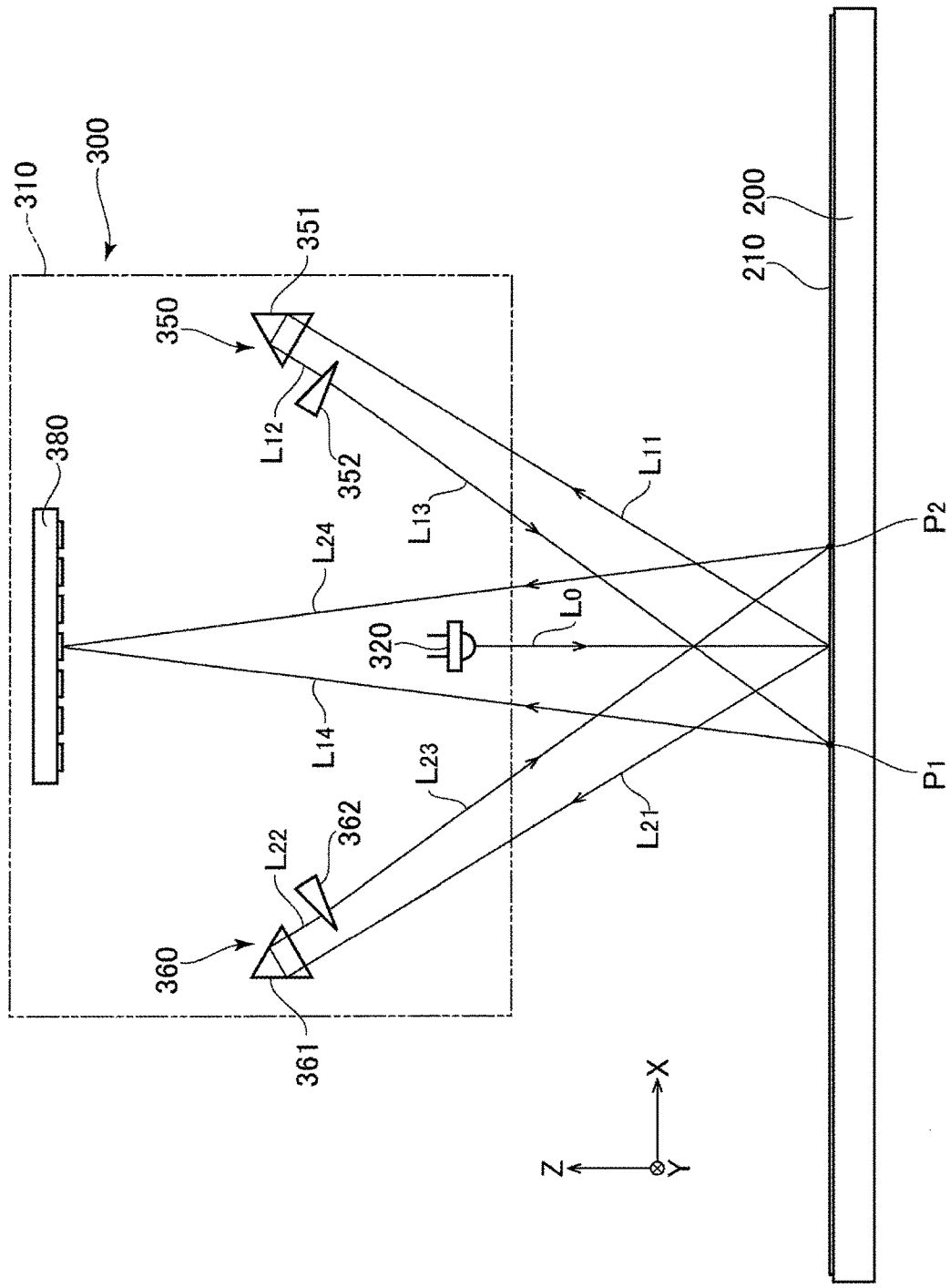
FIG. 7 is a view illustrating the second embodiment.

A second embodiment is illustrated in FIGS. 6 and 7.

The basic configuration of the second embodiment is the same as that of the first embodiment, and elements corresponding to each other are denoted by the same reference symbols.

In FIG. 6, the incident light (L11) on the first corner cube 351 shifts in the X-Z plane, and then is emitted in parallel with the incident light (L11).

The light (L12) emitted from the first corner cube 351 passes through the first wedge prism 352, and deflects by the predetermined very small angle (+θ) in the positive rotation direction.

The light (L13) emitted from the first wedge prism 352 enters the main scale 200.

A point on the main scale 200 where the light (L13) emitted from the first wedge prism 352 enters is referred to as a retroreflection incidence point P1.

The light (L13) is reflected and diffracted at the retroreflection incidence point P1 by the main scale 200.

In the reflected and diffracted light, the positive first-order diffracted light L14 enters the light receiving unit 380.

The incident light (L21) on the second corner cube 361 shifts in the X-Z plane, and then is emitted in parallel with the incident light (L21). The light L22 emitted from the second corner cube 361 passes through the second wedge prism 362, and deflects by the predetermined very small angle (−θ) in the negative rotation direction.

The light (L23) emitted from the second wedge prism 362 enters the main scale 200.

A point on the main scale 200 where the light (L23) emitted from the second wedge prism 362 enters is referred to as a retroreflection incidence point P2. The light (L23) is reflected and diffracted at the retroreflection incidence point P2 by the main scale 200. In the reflected and diffracted light, the negative first-order diffracted light L24 enters the light receiving unit 380.

As described above, even in the second embodiment, surely, the same effects as those of the first embodiment described above is obtained. Also, in the second embodiment, all of the light paths are in the X-Z plane. Therefore, a photoelectric encoder suitable for thinning in the width direction is obtained.

Third Embodiment

Figure 8:
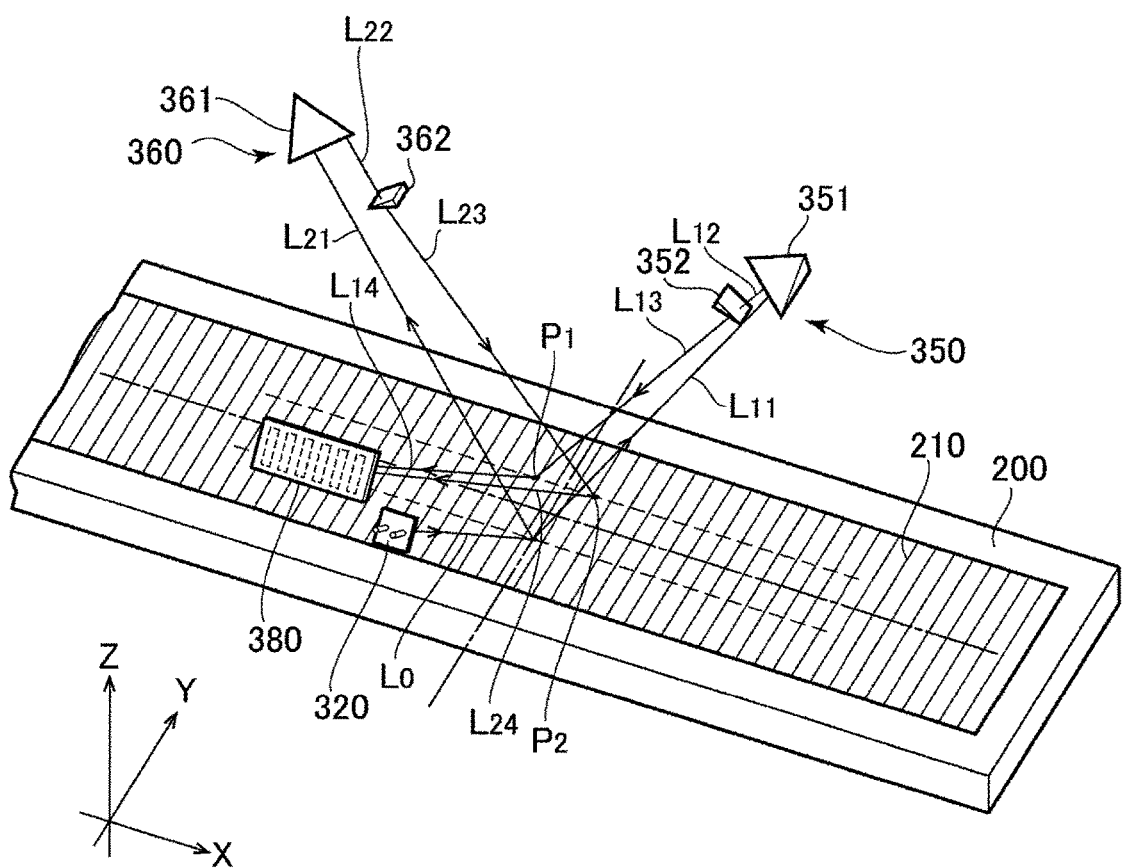
FIG. 8 is a view illustrating a third embodiment.

A third embodiment is shown in FIG. 8.

The basic configuration of the third embodiment is the same as that of the first embodiment, and elements corresponding to each other are denoted by the same reference symbols.

In the third embodiment, the source light L0 obliquely enters the main scale 200.

In the first embodiment, the source light L0 is emitted in parallel with the Z axis, and enters the main scale 200 at a right angle. In contrast with this, in this third embodiment, the source light L0 is emitted at a predetermined angle with respect to the Z axis in the Y-Z plane, and obliquely enters the main scale 200.

Since the source light L0 obliquely enters the main scale, the installation positions and angles of the first and second retroreflecting units 350 and 360 have been changed, and disposition of the light receiving unit 380 has also been changed. (With reference to the X-Z plane, on the negative side of the Y axis, the light source 320 and the light receiving unit 380 are disposed, and on the positive side of the Y axis, the second retroreflecting unit 360 is disposed.)

Basically, these optical elements may be disposed such that light retroreflected by the first second retroreflecting unit 350 and light retroreflected by the second retroreflecting unit 360 form an interference fringe on the light receiving unit 380.

As described above, even in the third embodiment, surely, the same effects as those of the first embodiment described above is obtained.

Also, according to the third embodiment, the height is suppressed, and thus a photoelectric encoder suitable for thinning in the height direction can be obtained.

Fourth Embodiment

Figure 9:
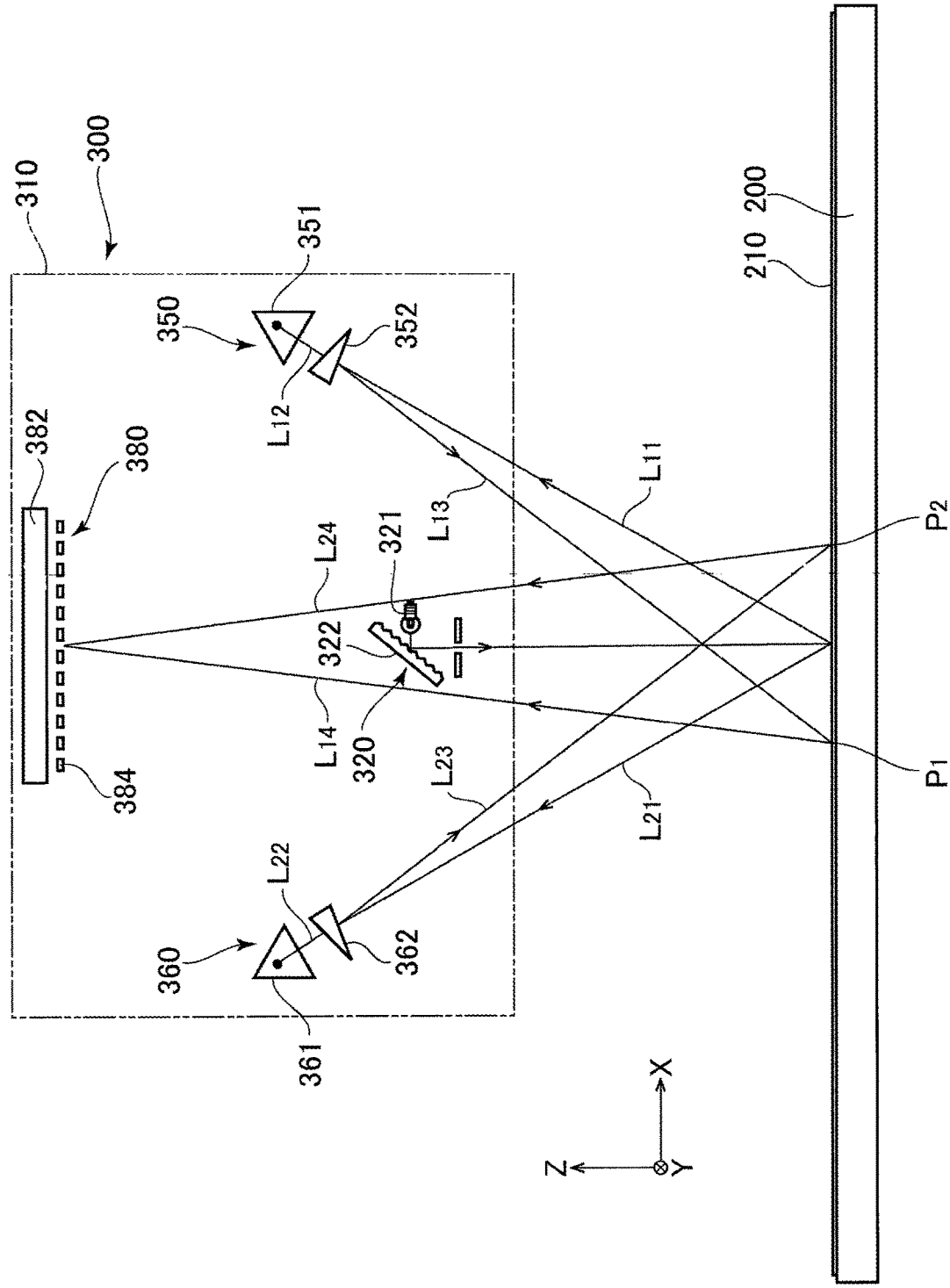
FIG. 9 is a view illustrating a fourth embodiment.

A fourth embodiment is shown in FIG. 9.

The basic configuration of the fourth embodiment is the same as that of the first embodiment, and elements corresponding to each other are denoted by the same reference symbols.

In FIG. 9, the light source 320 is composed of a white light source 321 and a light source grating (diffraction grating) 322, in place of the laser light source. Even in this light source, surely, coherent light can be obtained.

Also, the light receiving unit 380 may be configured by an index scale (a diffraction grating) 384 and a light receiving device 382 (a single light receiving device 382 having a wide light receiving surface), in place of the light receiving device array 381.

Here, the grating pitch of the index scale 384 is set to be the same as the grating pitch of the main scale 200. Then, in response to relative movement between the main scale 200 and the detecting head unit 300, a signal which varies with a cycle of P/2 is obtained.

Even in this fourth embodiment, it is possible to obtain the same effects as those of the above described embodiments.

Also, the present invention is not limited to the above described embodiments, and can be appropriately modified without departing from the scope.

In the embodiments, the wedge prisms 352 and 362 are disposed on the light paths of the light (L12 and L22) emitted from the corner cubes 351 and 361. However, the wedge prisms 352 and 362 may be disposed on the light paths of the incident light (L11 and L21) on the corner cubes 351 and 361.

In the embodiments described above, the case where the main scale is a reflection type diffraction grating has been exemplified. However, the main scale may be a transmission type diffraction grating.

In this case, it is only needed to make a modification such that the first retroreflecting unit 350 and the second retroreflecting unit 360 are positioned on the opposite side of the main scale 200 to the light source and the light receiving unit. An example thereof is shown in FIG. 10.

What is claimed is:

1. A displacement detecting device comprising:
   a scale diffraction grating; and
   a detecting head unit that is disposed so as to be relatively movable with respect to the scale diffraction grating, and detects the amount of relative displacement to the scale diffraction grating,
   wherein the detecting head unit includes
      a light source that emits light toward the scale diffraction grating,
      a first retroreflecting unit that retroreflects positive s-order diffracted light of light diffracted by the scale diffraction grating, such that the retroreflected light enters the scale diffraction grating again,
      a second retroreflecting unit that retroreflects negative s-order diffracted light of the light diffracted by the scale diffraction grating, such that the retroreflected light enters the scale diffraction grating again, and
      a common light receiving unit that receives an interference fringe formed on the common light receiving unit by the light retroreflected by the first retroreflecting unit and diffracted by the scale diffraction grating and the light retroreflected by the second retroreflecting unit and diffracted by the scale diffraction grating,
   each of the first retroreflecting unit and the second retroreflecting unit has a deflecting function of deflecting light incident on the corresponding retroreflecting unit by a predetermined angle and then emitting the light (wherein "s" is an integer of 1 or greater), and
   a position of a point on the scale diffraction grating where the light retroreflected from the first retroreflecting unit enters is different from a position of a point on the scale diffraction grating where the light retroreflected from the second retroreflecting unit enters.

2. The displacement detecting device according to claim 1, wherein:
   each of the first retroreflecting unit and the second retroreflecting unit includes a corner cube and a wedge prism.

3. The displacement detecting device according to claim 2, wherein:
   the corner cube and the wedge prism are integrated.

4. The displacement detecting device according to claim 1, wherein:
   each of the first retroreflecting unit and the second retroreflecting unit includes a reflective mirror and two lenses having different focal lengths.

* * * * *